US009448742B2

(12) United States Patent
Cheng et al.

(10) Patent No.: US 9,448,742 B2
(45) Date of Patent: Sep. 20, 2016

(54) COMMUNICATION BETWEEN A HOST AND A SECONDARY STORAGE DEVICE

(71) Applicant: Western Digital Technologies, Inc., Irvine, CA (US)

(72) Inventors: Jonathan K. Cheng, Mission Viejo, CA (US); Si Ho, Laguna Hills, CA (US)

(73) Assignee: WESTERN DIGITAL TECHNOLOGIES, INC., Irvine, CA (US)

( * ) Notice: Subject to any disclaimer, the term of this patent is extended or adjusted under 35 U.S.C. 154(b) by 108 days.

(21) Appl. No.: 14/271,683

(22) Filed: May 7, 2014

(65) Prior Publication Data

US 2015/0277805 A1 Oct. 1, 2015

Related U.S. Application Data

(60) Provisional application No. 61/971,026, filed on Mar. 27, 2014.

(51) Int. Cl.
*G06F 3/06* (2006.01)

(52) U.S. Cl.
CPC ........... *G06F 3/0658* (2013.01); *G06F 3/0604* (2013.01); *G06F 3/0659* (2013.01); *G06F 3/0683* (2013.01); *G06F 2003/0697* (2013.01)

(58) Field of Classification Search
CPC ............... G06F 2003/0697; G06F 3/0604; G06F 3/0658; G06F 3/06; G06F 3/0601; G06F 3/0628; G06F 3/0655; G06F 3/067; G06F 3/0605; G06F 3/0659; G06F 3/0613; G06F 3/0689
See application file for complete search history.

(56) References Cited

U.S. PATENT DOCUMENTS

| 6,775,831 | B1* | 8/2004 | Carrasco | H04L 29/06 707/999.003 |
|---|---|---|---|---|
| 6,856,556 | B1 | 2/2005 | Hajeck | |
| 6,895,500 | B1* | 5/2005 | Rothberg | G11B 27/36 360/31 |
| 7,042,664 | B2 | 5/2006 | Gill et al. | |
| 7,126,857 | B2 | 10/2006 | Hajeck | |
| 7,430,136 | B2 | 9/2008 | Merry, Jr. et al. | |
| 7,447,807 | B1 | 11/2008 | Merry et al. | |
| 7,502,256 | B2 | 3/2009 | Merry, Jr. et al. | |
| 7,509,441 | B1 | 3/2009 | Merry et al. | |
| 7,596,643 | B2 | 9/2009 | Merry, Jr. et al. | |

(Continued)

OTHER PUBLICATIONS

Stevens, Curtis E., "Information Technology—SMART Command Transport (SCT)", T13/1701DT-N, Rev. 5, American National Standards Institute, Feb. 24, 2005, pp. 1-40.

(Continued)

*Primary Examiner* — Jared Rutz
*Assistant Examiner* — Jean Edouard

(57) ABSTRACT

Communication between a host and a data storage device (DSD) including a first media for storing data and a second media for storing data. In one embodiment, a first controller of the DSD is configured to control operation of the first media and a second controller of the DSD is configured to control operation of the second media. The first controller receives a key data block of a monitoring system from the host with the key data block including a task file. The key data block is evaluated to determine if the key data block is directed to the second media, and if it is determined that the key data block is directed to the second media, the task file of the key data block is sent from the first controller to the second controller.

32 Claims, 8 Drawing Sheets

(56) References Cited

U.S. PATENT DOCUMENTS

| | | |
|---|---|---|
| 7,653,778 B2 | 1/2010 | Merry, Jr. et al. |
| 7,685,337 B2 | 3/2010 | Merry, Jr. et al. |
| 7,685,338 B2 | 3/2010 | Merry, Jr. et al. |
| 7,685,374 B2 | 3/2010 | Diggs et al. |
| 7,733,712 B1 | 6/2010 | Walston et al. |
| 7,765,373 B1 | 7/2010 | Merry et al. |
| 7,853,747 B2 | 12/2010 | Byers et al. |
| 7,898,855 B2 | 3/2011 | Merry, Jr. et al. |
| 7,912,991 B1 | 3/2011 | Merry et al. |
| 7,936,603 B2 | 5/2011 | Merry, Jr. et al. |
| 7,962,792 B2 | 6/2011 | Diggs et al. |
| 7,984,200 B1 | 7/2011 | Bombet et al. |
| 8,078,918 B2 | 12/2011 | Diggs et al. |
| 8,090,899 B1 | 1/2012 | Syu |
| 8,095,851 B2 | 1/2012 | Diggs et al. |
| 8,108,692 B1 | 1/2012 | Merry et al. |
| 8,122,185 B2 | 2/2012 | Merry, Jr. et al. |
| 8,127,048 B1 | 2/2012 | Merry et al. |
| 8,135,903 B1 | 3/2012 | Kan |
| 8,151,020 B2 | 4/2012 | Merry, Jr. et al. |
| 8,161,227 B1 | 4/2012 | Diggs et al. |
| 8,166,245 B2 | 4/2012 | Diggs et al. |
| 8,243,525 B1 | 8/2012 | Kan |
| 8,254,172 B1 | 8/2012 | Kan |
| 8,261,012 B2 | 9/2012 | Kan |
| 8,296,625 B2 | 10/2012 | Diggs et al. |
| 8,312,207 B2 | 11/2012 | Merry, Jr. et al. |
| 8,316,176 B1 | 11/2012 | Phan et al. |
| 8,341,339 B1 | 12/2012 | Boyle et al. |
| 8,375,151 B1 | 2/2013 | Kan |
| 8,392,635 B2 | 3/2013 | Booth et al. |
| 8,397,107 B1 | 3/2013 | Syu et al. |
| 8,407,449 B1* | 3/2013 | Colon ............... G06F 12/0246 711/103 |
| 8,423,722 B1 | 4/2013 | Deforest et al. |
| 8,433,858 B1 | 4/2013 | Diggs et al. |
| 8,443,167 B1 | 5/2013 | Fallone et al. |
| 8,447,920 B1 | 5/2013 | Syu |
| 8,458,435 B1 | 6/2013 | Rainey, III et al. |
| 8,478,930 B1 | 7/2013 | Syu |
| 8,489,854 B1 | 7/2013 | Colon et al. |
| 8,503,237 B1 | 8/2013 | Horn |
| 8,521,972 B1 | 8/2013 | Boyle et al. |
| 8,549,236 B2* | 10/2013 | Diggs ............... G06F 11/1456 711/103 |
| 8,583,835 B1 | 11/2013 | Kan |
| 8,601,311 B2 | 12/2013 | Horn |
| 8,601,313 B1 | 12/2013 | Horn |
| 8,612,669 B1 | 12/2013 | Syu et al. |
| 8,612,804 B1 | 12/2013 | Kang et al. |
| 8,615,681 B2 | 12/2013 | Horn |
| 8,638,602 B1 | 1/2014 | Horn |
| 8,639,872 B1 | 1/2014 | Boyle et al. |
| 8,683,113 B2 | 3/2014 | Abasto et al. |
| 8,700,834 B2 | 4/2014 | Horn et al. |
| 8,700,950 B1 | 4/2014 | Syu |
| 8,700,951 B1 | 4/2014 | Call et al. |
| 8,706,985 B1 | 4/2014 | Boyle et al. |
| 8,707,104 B1 | 4/2014 | Jean |
| 8,713,066 B1 | 4/2014 | Lo et al. |
| 8,713,357 B1 | 4/2014 | Jean et al. |
| 8,719,531 B2 | 5/2014 | Strange et al. |
| 8,724,422 B1 | 5/2014 | Agness et al. |
| 8,725,931 B1 | 5/2014 | Kang |
| 8,745,277 B2 | 6/2014 | Kan |
| 8,751,728 B1 | 6/2014 | Syu et al. |
| 8,769,190 B1 | 7/2014 | Syu et al. |
| 8,769,232 B2 | 7/2014 | Suryabudi et al. |
| 8,775,720 B1 | 7/2014 | Meyer et al. |
| 8,782,327 B1 | 7/2014 | Kang et al. |
| 8,782,334 B1* | 7/2014 | Boyle ............... G06F 3/0601 711/111 |
| 8,788,778 B1 | 7/2014 | Boyle |
| 8,788,779 B1 | 7/2014 | Horn |
| 8,788,880 B1 | 7/2014 | Gosla et al. |
| 8,793,429 B1 | 7/2014 | Call et al. |
| 2003/0088720 A1* | 5/2003 | Fukuzawa ............ G06F 3/0623 710/65 |
| 2007/0168607 A1 | 7/2007 | Takai et al. |
| 2008/0059694 A1* | 3/2008 | Lee ................... G06F 3/0625 711/103 |
| 2008/0130156 A1* | 6/2008 | Chu ................... G11B 20/18 360/71 |
| 2008/0147962 A1* | 6/2008 | Diggs ................ G06F 11/1456 711/103 |
| 2009/0049241 A1 | 2/2009 | Ohno et al. |
| 2009/0103203 A1* | 4/2009 | Yoshida ............ G06F 12/0871 360/75 |
| 2010/0017564 A1* | 1/2010 | Heo .................... G06F 3/061 711/112 |
| 2010/0122047 A1* | 5/2010 | Vasilievna ........... G06F 3/0623 711/155 |
| 2010/0174849 A1* | 7/2010 | Walston .............. G06F 3/061 711/103 |
| 2010/0250793 A1 | 9/2010 | Syu |
| 2011/0010490 A1* | 1/2011 | Kwon ................ G06F 3/0611 711/103 |
| 2011/0022828 A1 | 1/2011 | Delaney et al. |
| 2011/0099323 A1* | 4/2011 | Syu .................... G06F 12/0246 711/103 |
| 2011/0238938 A1* | 9/2011 | Kloeppner ........... G06F 3/0611 711/162 |
| 2011/0283049 A1* | 11/2011 | Kang ................ G06F 12/0246 711/103 |
| 2012/0173790 A1* | 7/2012 | Hetzler ............. G06F 12/0868 711/103 |
| 2012/0260020 A1 | 10/2012 | Suryabudi et al. |
| 2012/0278531 A1 | 11/2012 | Horn |
| 2012/0284460 A1 | 11/2012 | Guda |
| 2012/0290779 A1* | 11/2012 | Eleftheriou .......... G06F 3/0616 711/103 |
| 2012/0324191 A1 | 12/2012 | Strange et al. |
| 2013/0132638 A1 | 5/2013 | Horn et al. |
| 2013/0145106 A1 | 6/2013 | Kan |
| 2013/0198557 A1* | 8/2013 | Bensinger ........... G06F 11/1451 714/3 |
| 2013/0212325 A1 | 8/2013 | Hashimoto |
| 2013/0290793 A1 | 10/2013 | Booth et al. |
| 2013/0304978 A1* | 11/2013 | Trika ................. G06F 12/0246 711/103 |
| 2014/0059405 A1 | 2/2014 | Syu et al. |
| 2014/0101369 A1 | 4/2014 | Tomlin et al. |
| 2014/0115427 A1 | 4/2014 | Lu |
| 2014/0133220 A1 | 5/2014 | Danilak et al. |
| 2014/0136753 A1 | 5/2014 | Tomlin et al. |
| 2014/0149666 A1* | 5/2014 | Nakagawa .......... G06F 3/0605 711/114 |
| 2014/0149826 A1 | 5/2014 | Lu et al. |
| 2014/0157078 A1 | 6/2014 | Danilak et al. |
| 2014/0181432 A1 | 6/2014 | Horn |
| 2014/0223255 A1 | 8/2014 | Lu et al. |
| 2015/0149490 A1* | 5/2015 | Kim .................... G06F 7/24 707/754 |
| 2015/0178009 A1* | 6/2015 | Shin .................. G06F 3/0625 711/103 |
| 2015/0178224 A1* | 6/2015 | Seo .................... G06F 21/64 711/166 |

OTHER PUBLICATIONS

International Search Report and Written Opinion dated Jun. 18, 2015 from related PCT Serial No. PCT/US2015/022791, 14 pages.

\* cited by examiner

| Byte Address / Offset | Name | Value | Description |
|---|---|---|---|
| A1 | Action Code | V1 | Specifies Solid-State Memory |
| A2 | Function Code | V2 | Generic Read Command |
|  |  | V3 | Generic Write Command |
|  |  | V4 | Generic No Data Transfer Command |
|  |  | V5 | Generic Get Status Command |
| A3 | PassCode | V6 | PassCode for Solid-State Memory |
| A4 | Payload Size |  | Size of Data To Be Transferred |
| A5 | Task File Size | V7 | Size of Task File Image |
| A6 | Input Task File Image |  | Input Task File Image For Solid-State Memory |
| A7 | Flags |  | General Purpose Flags |
| A8 | Reserved | V8 | Reserved |

FIG. 5

| Byte Address / Offset | Description |
|---|---|
| B1 | Task File Features Register |
| B2 | Task File X Features Register |
| B3 | Task File Sector Count Register |
| B4 | Task File X Sector Count Register |
| B5 | Task File LBA Low Register |
| B6 | Task File X LBA Low Register |
| B7 | Task File LBA Mid Register |
| B8 | Task File X LBA Mid Register |
| B9 | Task File LBA High Register |
| B10 | Task File X LBA High Register |
| B11 | Task File Device Register / Reserved |
| B12 | Task File Command Register |

FIG. 6

COMMUNICATION BETWEEN A HOST AND A SECONDARY STORAGE DEVICE

CROSS-REFERENCE TO RELATED APPLICATION

This application claims the benefit of U.S. Provisional Application No. 61/971,026, filed on Mar. 27, 2014, which is hereby incorporated by reference in its entirety.

BACKGROUND

Data Storage Devices (DSDs) are often used to record data onto or to reproduce data from a Non-Volatile Memory (NVM) media. Some DSDs include multiple types of NVM media. For example, in the case of a Solid-state Hybrid Drive (SSHD), a solid-state NVM media such as a flash memory is used for storing data in addition to a second type of NVM media such as a rotating magnetic disk.

In devices with different types of NVM media, one type of NVM media may be controlled by a primary controller as a primary storage device while another type of NVM media may be controlled by a secondary controller as a secondary storage device. For example, an SSHD may include a primary controller for communication with a host and for operation of a disk, while a secondary controller is used for operation of a solid-state memory. In such an arrangement, it can be difficult, if not impossible, to directly communicate with the secondary controller from the standpoint of the host. This can make obtaining diagnostic or usage information about the solid-state memory difficult. In some cases, troubleshooting the secondary storage device can require physically removing the secondary storage device from the SSHD in order to troubleshoot the secondary storage device using a tool (e.g., a software application) from the manufacturer of the secondary storage device.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

FIG. 5 is an example of a Self-Monitoring, Analysis and Reporting Technology (SMART) key data block according to an embodiment.

FIG. 6 is an example of a task file embedded in the SMART key data block of FIG. 5 according to an embodiment.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Figure 1:
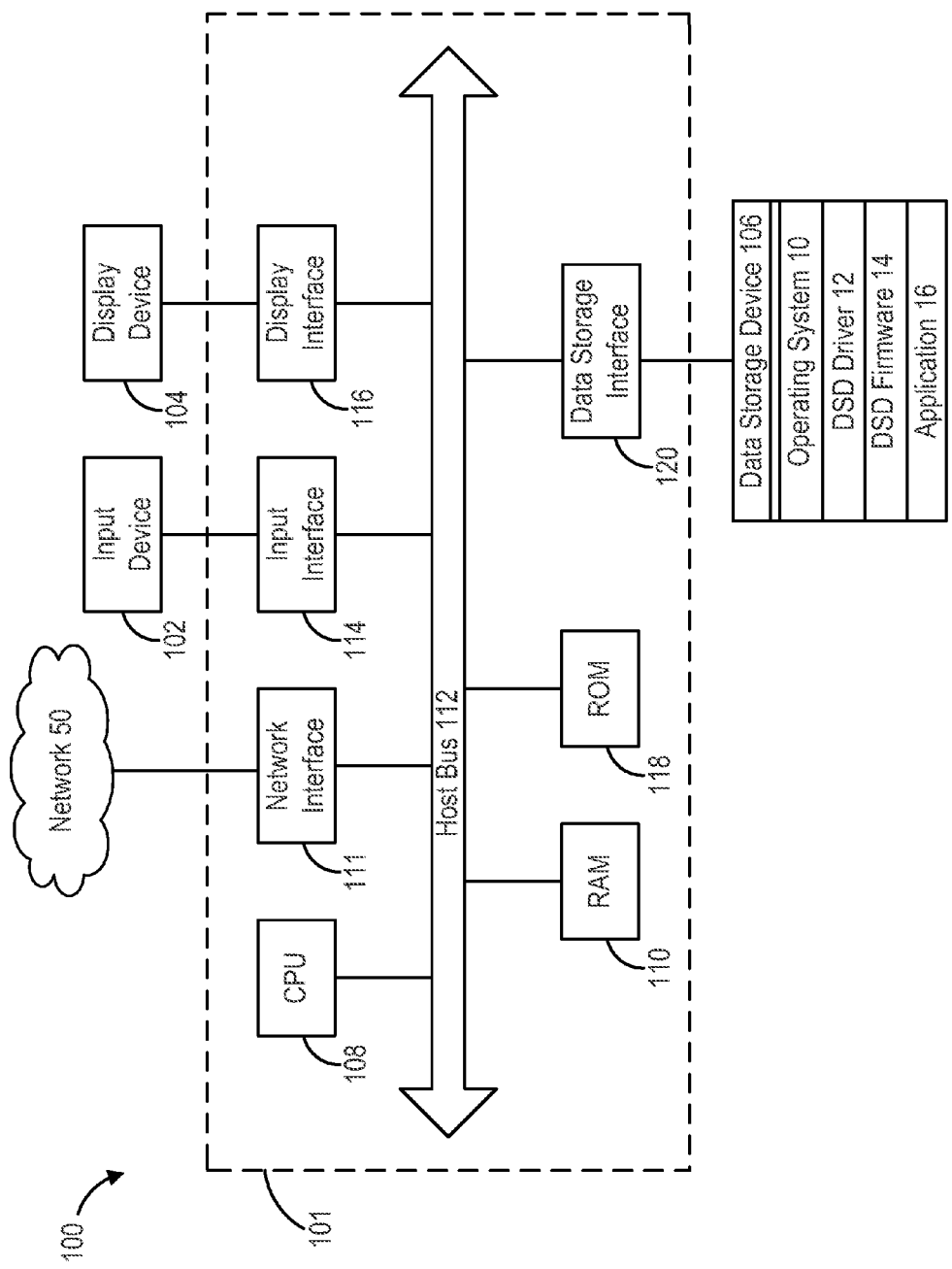
FIG. 1 is a block diagram depicting a system including a host and a Data Storage Device (DSD) according to an embodiment.

FIG. 1 shows system 100 according to an embodiment which includes host 101, input device 102, display device 104 and Data Storage Device (DSD) 106. System 100 can be, for example, a computer system (e.g., server, desktop, mobile/laptop, tablet, smartphone, etc.) or other electronic device such as a digital video recorder (DVR). In this regard, system 100 may be a stand-alone system or part of a network, such as network 50, which can, for example, be a local or wide area network or the Internet.

Those of ordinary skill in the art will appreciate that system 100 can include more or less than those elements shown in FIG. 1 and that the disclosed processes can be implemented in other environments Input device 102 can be a keyboard, scroll wheel, or pointing device allowing a user of system 100 to enter information and commands to system 100, or to allow a user to manipulate objects displayed on display device 104. In other embodiments, input device 102 and display device 104 can be combined into a single component, such as a touch-screen that displays objects and receives user input.

In the embodiment of FIG. 1, host 101 includes Central Processing Unit (CPU) 108 which can be implemented using one or more processors for executing instructions including a microcontroller, a Digital Signal Processor (DSP), an Application Specific Integrated Circuit (ASIC), a Field Programmable Gate Array (FPGA), hard-wired logic, analog circuitry and/or a combination thereof. CPU 108 interfaces with host bus 112. Also interfacing with host bus 112 are Random Access Memory (RAM) 110, input interface 114 for input device 102, display interface 116 for display device 104, Read Only Memory (ROM) 118, network interface 111, and data storage interface 120 for DSD 106.

RAM 110 is a volatile memory of host 101 that interfaces with host bus 112 so as to provide information stored in RAM 110 to CPU 108 during execution of instructions in software programs such as Operating System (OS) 10, DSD driver 12, or application 16. More specifically, CPU 108 first loads computer-executable instructions from DSD 106 or another DSD into a region of RAM 110. CPU 108 can then execute the stored process instructions from RAM 110. Data such as data to be stored in DSD 106 or data retrieved from DSD 106 can also be stored in RAM 110 so that the data can be accessed by CPU 108 during execution of software programs to the extent that such software programs have a need to access and/or modify the data.

As shown in FIG. 1, DSD 106 can be configured to store one or more of OS 10, DSD driver 12, DSD firmware 14, and application 16. DSD driver 12 provides a software interface for DSD 106 on host 101. DSD firmware 14 includes computer-executable instructions for DSD 106 that control operation of DSD 106 when executed by a controller of DSD 106 (e.g., HD controller 122 or SSD controller 124 in FIG. 2).

Application 16 can be, for example, a program used by host 101 as a tool for interfacing with DSD 106 or a portion of DSD 106. In one implementation, application 16 is an application for a secondary storage device of DSD 106 including a solid-state memory (i.e., solid-state memory 128 in FIG. 2) and a controller for the solid-state memory (i.e., SSD controller 124 in FIG. 2). In such an implementation, use of application 16 can provide host 101 with diagnostic and use information about the solid-state memory of DSD 106.

Data storage interface 120 is configured to interface host 101 with DSD 106 and interfaces according to a Serial Advanced Technology Attachment (SATA) standard. In other embodiments, data storage interface 120 can interface with DSD 106 using other standards such as, for example, PCI express (PCIe) or Serial Attached SCSI (SAS).

Although FIG. 1 depicts the co-location of host 101 and DSD 106, in other embodiments the two need not be physically co-located. In such embodiments, DSD 106 may be located remotely from host 101 and connected to host 101 via a network interface such as network interface 111.

Figure 2:
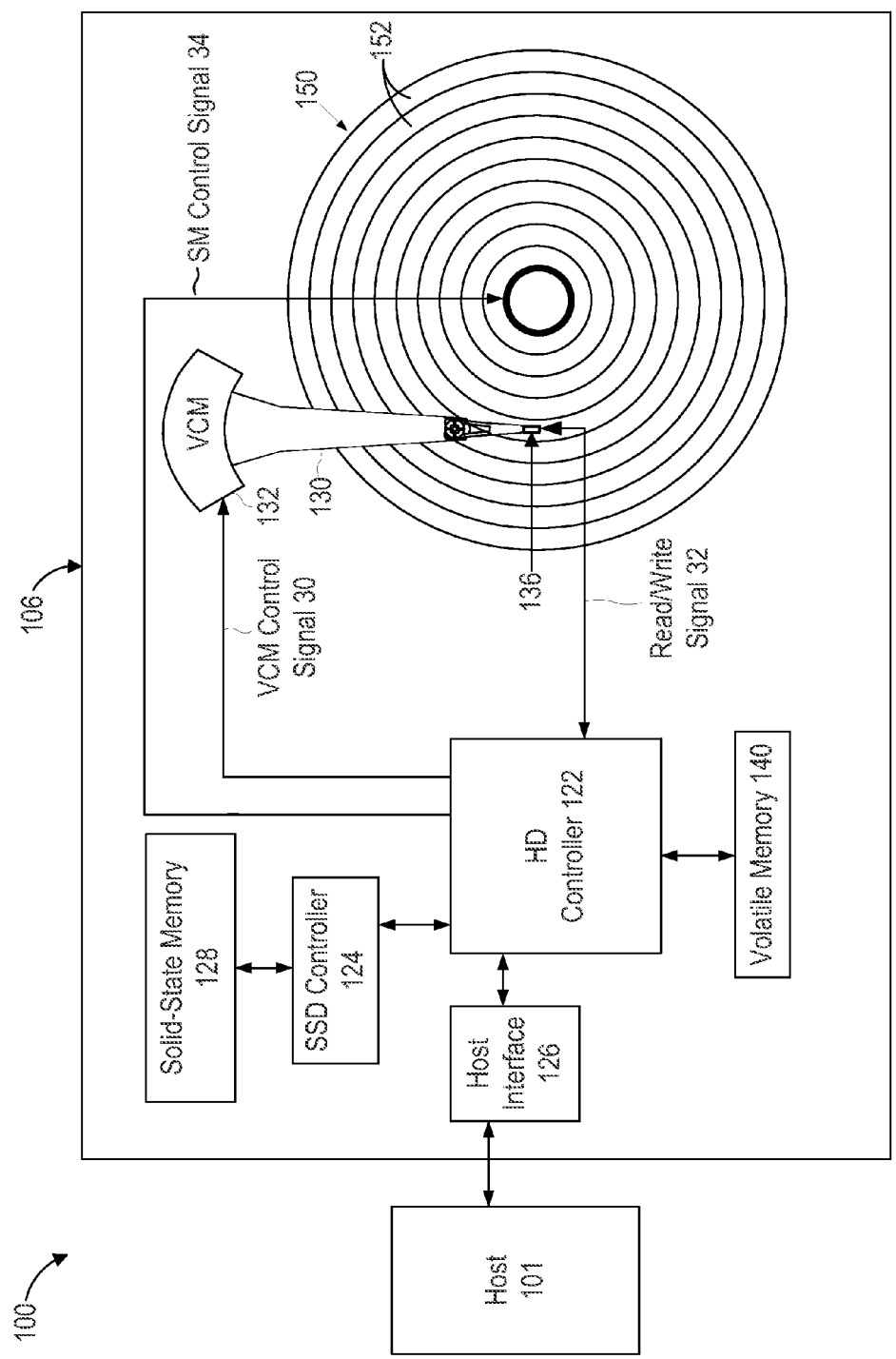
FIG. 2 is a block diagram depicting the DSD of FIG. 1 according to an embodiment.

FIG. 2 is a block diagram depicting components of DSD 106 according to an embodiment. As shown in FIG. 2, DSD 106 includes both a first media (e.g., disk 150) and a second media (e.g., solid-state memory 128) for storing data. In this regard, DSD 106 can be considered a Solid-State Hybrid Drive (SSHD) in that it includes both solid-state Non-Volatile Memory (NVM) media and disk NVM media. In other embodiments, each of disk 150 or solid-state memory 128 may be replaced by multiple Hard Disk Drives (HDDs) or multiple Solid-State Drives (SSDs), respectively, so that DSD 106 includes pools of HDDs and/or SSDs. As with FIG. 1, those of ordinary skill in the art will appreciate that DSD 106 can include more or less than those elements shown in FIG. 2 and that the disclosed processes can be implemented in other environments.

SSD controller 124 controls operation of solid-state memory 128 and can also include a microcontroller, a Digital Signal Processor (DSP), an Application Specific Integrated Circuit (ASIC), a Field Programmable Gate Array (FPGA), hard-wired logic, analog circuitry and/or a combination thereof. In one implementation, SSD controller 124 can include a System on a Chip (SoC).

In the example embodiment of FIG. 2, HD Controller 122 controls operation for magnetic disk 150 and can include circuitry such as one or more processors for executing instructions and can include a microcontroller, a Digital Signal Processor (DSP), an Application Specific Integrated Circuit (ASIC), a Field Programmable Gate Array (FPGA), hard-wired logic, analog circuitry and/or a combination thereof. In one implementation, HD controller 122 can include a System on a Chip (SoC).

Host interface 126 is configured to interface DSD 106 with host 101 and interfaces with data storage interface 120 according to a Serial Advanced Technology Attachment (SATA) standard. In other embodiments, host interface 126 can interface with data storage interface 120 using other standards such as, for example, PCI express (PCIe) or Serial Attached SCSI (SAS). In some embodiments, host interface 126 can be included as part of HD controller 122.

In the embodiment of FIG. 1, host interface 126 receives data and commands from host 101 and provides the data and commands for both SSD controller 124 and HD controller 122 through HD controller 122. In this regard, HD controller 122 serves as a primary controller for communication with host 101 and SSD controller 124 serves as a secondary controller behind HD controller 122 from the point of view of host 101. Data and commands intended for SSD controller 124 are passed to SSD controller 124 by HD controller 122. In this regard, host 101 may provide hinting indicating whether certain data or commands are intended for SSD controller 124 or HD controller 122.

In FIG. 1, disk 150 is rotated by a spindle motor (not shown). DSD 106 also includes head 136 connected to the distal end of actuator 130 which is rotated by Voice Coil Motor (VCM) 132 to position head 136 in relation to disk 150. HD controller 122 can control the position of head 136 and the rotation of disk 150 using VCM control signal 30 and SM control signal 34, respectively.

As understood by those of ordinary skill in the art, disk 150 may form part of a disk pack with additional disks radially aligned below disk 150. In addition, head 136 may form part of a head stack assembly including additional heads with each head arranged to read data from and write data to a corresponding surface of a disk in a disk pack.

Disk 150 includes a number of radial spaced, concentric tracks 152 for storing data on a surface of disk 150. Each track 152 is divided into a number of sectors (not shown) that are spaced circumferentially along the tracks.

In addition to disk 150, the NVM media of DSD 106 also includes solid-state memory 128 for storing data. While the description herein refers to solid-state memory generally, it is understood that solid-state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., Single-Level Cell (SLC) memory, Multi-Level Cell (MLC) memory, or any combination thereof), NOR memory, EEPROM, Ferroelectric Memory (FeRAM), Magnetoresistive RAM (MRAM), other discrete NVM chips, or any combination thereof.

Volatile memory 140 can include, for example, a Dynamic Random Access Memory (DRAM) which can be used by DSD 106 to temporarily store data. Data stored in volatile memory 140 can include data read from NVM media (e.g., disk 150 or solid-state memory 128), data to be written to NVM media, instructions loaded from DSD firmware 14 for execution by HD controller 122 or SSD controller 124, or data used in executing DSD firmware 14.

In operation, host interface 126 receives commands from host 101 via host interface 126 for reading data from and writing data to the NVM media of DSD 106. In response to a write command from host 101, HD controller 122 may buffer the data to be written for the write command in volatile memory 140.

For data to be written to disk 150, HD controller 122 can encode the buffered data into write signal 32 which is provided to head 136 for magnetically writing data to the surface of disk 150.

In response to a read command for data stored on disk 150, HD controller 122 positions head 136 via VCM control signal 30 to magnetically read the data stored on the surface of disk 150. Head 136 sends the read data as read signal 32 to HD controller 122 for decoding, and the data is buffered in volatile memory 140 for transferring to host 101.

For data to be stored in solid-state memory 128, HD controller 122 receives data from host interface 126 and may buffer the data in volatile memory 140 for retrieval of the data by SSD controller 124. In other embodiments, HD controller 122 passes the data with the write command to SSD controller 124, which may buffer the data in volatile memory 140. SSD controller 124 retrieves the data to be written in solid-state memory 128 and encodes the data into charge values for charging cells (not shown) of solid-state memory 128 to store the data.

In response to a read command for data stored in solid-state memory 128, HD controller 122 transfers the read command to SSD controller 124, which reads current values for cells in solid-state memory 128 and decodes the current values into data that is buffered in volatile memory 140. HD controller 122 or SSD controller 124 retrieves the data from volatile memory 140 to transfer the data to host 101 via host interface 126.

SSD controller 124 and solid-state memory 128 can be provided as a secondary storage device by a different manufacturer or vendor than the manufacturer for the rest of DSD 106. Without aspects of the communication processes discussed below, it can be difficult to directly communicate with such a secondary storage device from the standpoint of host 101 or application 16 executed by host 101. This can make obtaining diagnostic and use information for solid-state memory 128 difficult or impossible without physically removing solid-state memory 128 from DSD 106.

In one embodiment, application 16 uses a monitoring system or protocol such as Self-Monitoring, Analysis and Reporting Technology (SMART) to monitor and collect information on solid-state memory 128 by constructing a SMART key data block as discussed below in more detail. Although the description below uses SMART as an example, other monitoring systems or protocols may be used in certain embodiments.

In an embodiment using SMART, host 101 or application 16 can use the SMART Command Transport (SCT), which provides an AT Attached (ATA) interface standard to send commands and data to DSD 106 and to retrieve data and status information from DSD 106 using SCT logs. Although such an example embodiment using SMART is primarily based on an ATA interface standard, other embodiments are not so limited and may accommodate monitoring information transferred with other interface standards. The SCT logs of DSD 106 can be accessed using SMART read log and SMART write log commands, in addition to read log (DMA) ext and write log (DMA) ext commands.

Some of the diagnostic and use information that can be collected about solid-state memory 128 using SCT logs includes, for example, temperature readings for solid-state memory 128, a number of unexpected power losses, a number of power cycles for solid-state memory 128, a number of program erase cycle failures, a total amount of data written to solid-state memory 128, an amount of data relocated within solid-state memory 128, or a number of failures in erasing or writing cells of solid-state memory 128. This information can be used by application 16 or host 101 to diagnose problems encountered with solid-state memory 128 or to estimate a usable life for solid-state memory 128.

Figure 3:
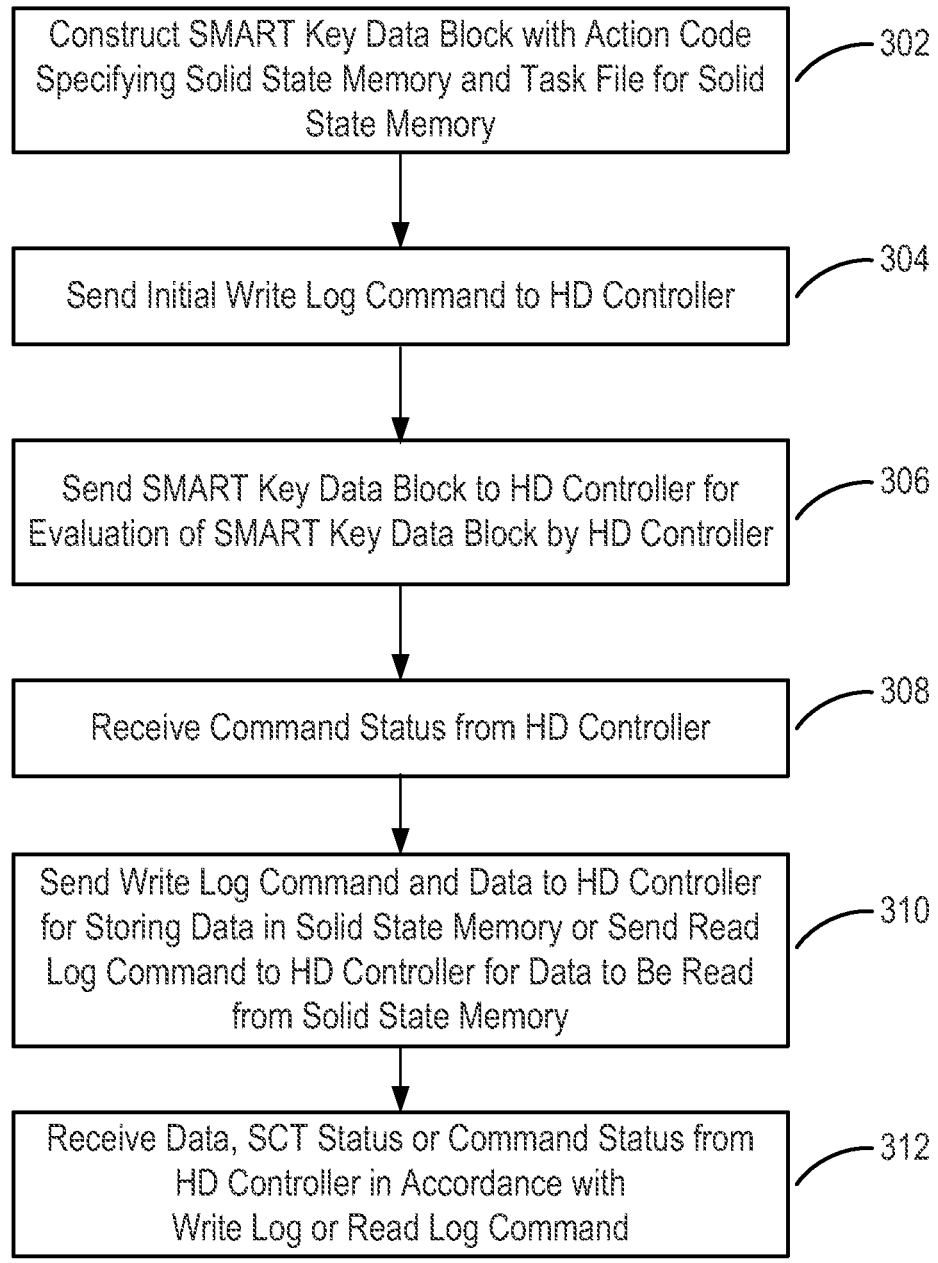
FIG. 3 is a flowchart for a communication process performed by a host to communicate with a secondary controller of a DSD according to an embodiment.

FIG. 3 is a flowchart for a communication process performed by host 101 when executing application 16 to communicate directly with SSD controller 124 according to an embodiment.

In block 302, host 101 constructs a SMART key data block with an action code specifying solid-state memory 128. An example of such a SMART key data is shown in FIG. 5. Host 101 also embeds a task file in the SMART key data block, such as task file 20 shown in FIG. 6. As discussed below in more detail, the task file can indicate whether SSD controller 124 is to perform a read command to read data from solid-state memory 128 or a write command to store data in solid-state memory 128.

In the example of a SMART key data block shown in FIG. 5, SMART key data block 18 is a data block which can be used with SCT in a command sequence with DSD 106. As shown in FIG. 5, SMART key data block 18 includes parameters for a command sequence with the parameters assigned to certain byte addresses or offsets in the data block. The byte addresses or offsets define fields in SMART key data block 18 that can be various sizes from a fraction of a byte to more than one byte.

In the example of FIG. 5, SMART key data block 18 includes the parameters of an action code, a function code, passcode, payload size, task file size, task file, flags and a reserved area. The action code at byte address/offset A1 specifies solid-state memory 128 with a value of V1 that can be recognized by HD controller 122. V1 can be a particular value assigned to solid-state memory 128 such that when evaluating SMART key data block 18, HD controller 122 can quickly determine that the task file embedded in SMART key data block 18 and certain data to follow as part of the command sequence should be passed to SSD controller 124 for processing without disruption.

The function code of SMART key data block 18 at byte address/offset A2 indicates the function of the command sequence. As shown in FIG. 5, the function code can include values V2 to V5 to indicate whether the command sequence includes a read command, a write command, a command that does not require the transfer of data between host 101 and DSD 106, or a command to request a status of solid-state memory 128.

The passcode at byte address/offset A3 with value V6 can be evaluated by SSD controller 124 to determine the validity of SMART key data block 18. As discussed in more detail with respect to the sequence diagrams of FIGS. 7 and 8, HD controller 122 can send a command status back to host 101 indicating the validity of SMART key data block 18. In one implementation, the passcode is a key identifying a particular manufacturer or vendor of solid-state memory 128. The passcode may be checked against a key accessed by HD controller 122 to determine the validity of SMART key data block 18. If HD controller 122 determines that the passcode does not match the key, HD controller 122 can return an error back to host 101 as the command status.

Byte address/offset A4 of SMART key data block 18 provides a payload size for data to be transmitted to DSD 106 as part of the command sequence. In some implementations, data transferred to DSD 106 can be part of a write log command sequence to write data to solid-state memory 128. Such data can, for example, include updates to a firmware used by SSD controller 124 to operate solid-state memory 128 or data used in testing solid-state memory 128.

Byte address/offset A5 of SMART key data block 18 indicates a size of V7 for a task file embedded in SMART key data block 18. Byte address/offset A6 includes space for a task file such as task file 20, which is depicted in FIG. 6. Application 16 or host 101 can embed or include a task file as part of providing SSD controller 124 with a task to perform, such as performing an ATA read command or an ATA write command as part of a particular maintenance or troubleshooting task for solid-state memory 128.

The example embodiment of task file 20 shown in FIG. 6 provides task file registers at byte addresses/offsets B1 to B12 to be used in performing an SCT command to follow SMART key data block 18. The byte addresses or offsets of task file 20 define fields that can be of various sizes from a fraction of a byte to more than one byte. In other embodiments, the information provided in task file 20 can be arranged in a different order than in FIG. 6. In addition, the information included in task file 20 can vary with more or less information from that shown in FIG. 6. The type of information in task file 20 may also differ from the type of information shown in FIG. 6 such that other task files may, for example, not include task file registers.

Returning to SMART key data block 18 depicted in FIG. 5, byte address/offset A7 of SMART key data block 18 includes flags to facilitate the command sequence to follow. In one implementation, the flags can provide settings for how data will be written to or read from solid-state memory 128 in the command sequence.

Byte address/offset A8 with a value V8 is reserved in SMART key data block 18 for particular uses that may vary or may remain unused depending on the manufacturer of solid-state memory 128.

In other embodiments, the parameters discussed above for SMART key data block 18 can be arranged in a different order than in FIG. 5. In addition, the information included in SMART key data block 18 can vary with more or less information from that shown in FIG. 5. The type of information in SMART key data block 18 may also differ from the types of information shown in FIG. 5.

Returning to FIG. 3, in block 304, host 101 sends an initial write log command for log address A via data storage interface 120 to initiate a command sequence. Log address A is used in SCT for initiating a command sequence with DSD 106 and for obtaining an SCT status from DSD 106 using either a read or write log command, respectively. As discussed in more detail below, log address B is used for sending data to DSD 106 or receiving data from DSD 106 using either a read or write log command, respectively. Table 1 below summarizes the use of log addresses A and B with respect to read log and write log commands.

TABLE 1

|  | Log Address A | Log Address B |
| --- | --- | --- |
| Write Log | Issue Command | Send Data |
| Read Log | Return Status | Receive Data |

In block 306 of FIG. 3, host 101 sends the SMART key data block to HD controller 122 using data storage interface 120. As discussed with reference to FIG. 4, the SMART key data block is evaluated by HD controller 122 to determine whether the SMART key data block is directed to solid-state memory 128.

In block 308, host 101 receives a command status from HD controller 122 via host interface 126 and data storage interface 120. The command status can indicate whether the SMART key data block sent in block 302 has been properly accepted or if there was an error in accepting the SMART key data block. Such an error may result from HD controller 122 determining that the SMART key data block is invalid based on a passcode of the SMART key data block.

In block 310, host 101 sends either a write log command with data to HD controller 122 or sends a read log command to HD controller 122. As noted above, and as shown in the sequence diagram of FIG. 7, a write log command for log address B will cause SSD controller 124 to write the data that follows the write log command to solid-state memory 128. Such data may be used for testing solid-state memory 128 or for updating a firmware for solid-state memory 128.

Figure 7:
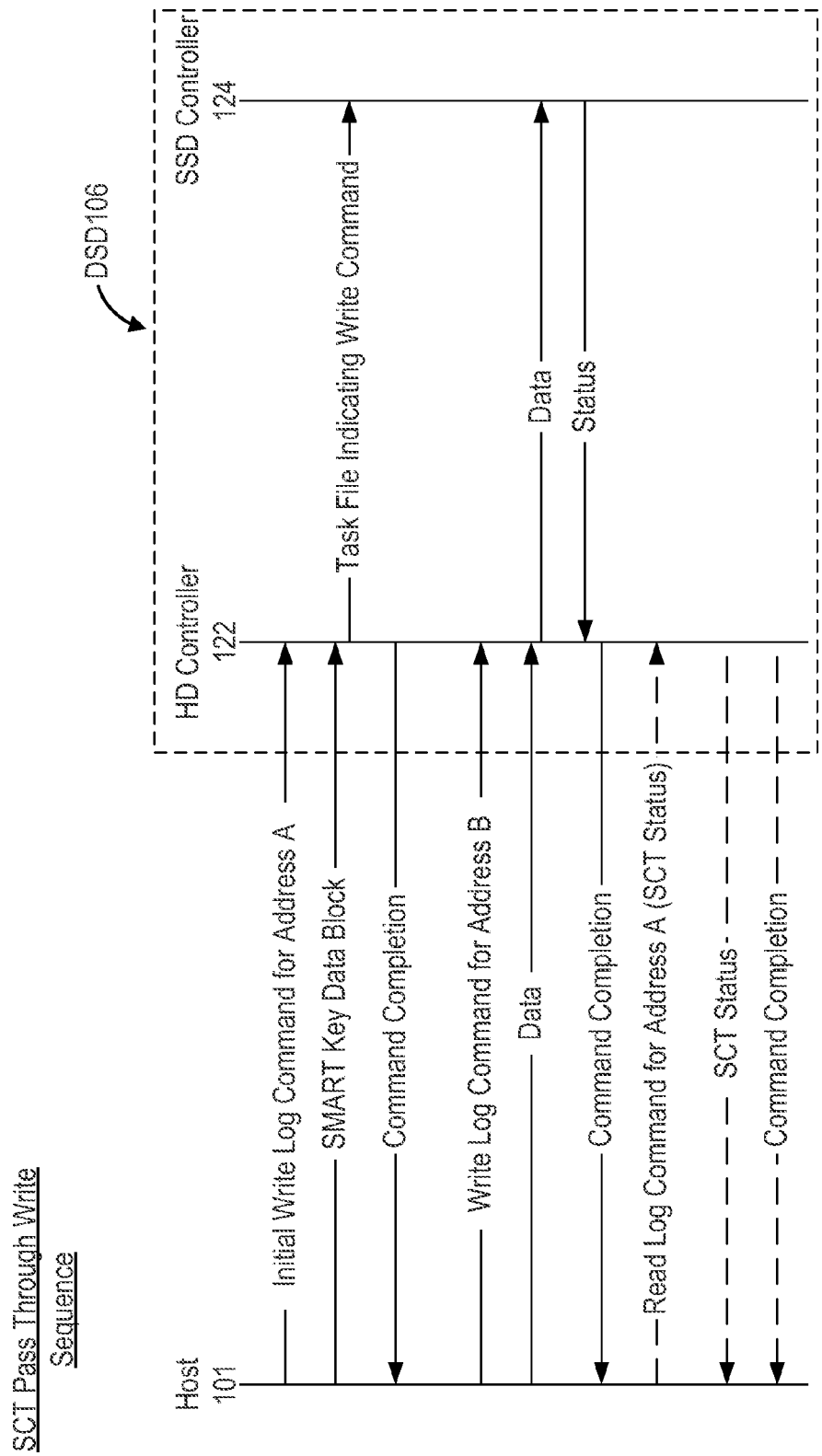
FIG. 7 is a sequence diagram depicting an example SMART Command Transport (SCT) pass through write sequence for according to an embodiment.
Figure 8:
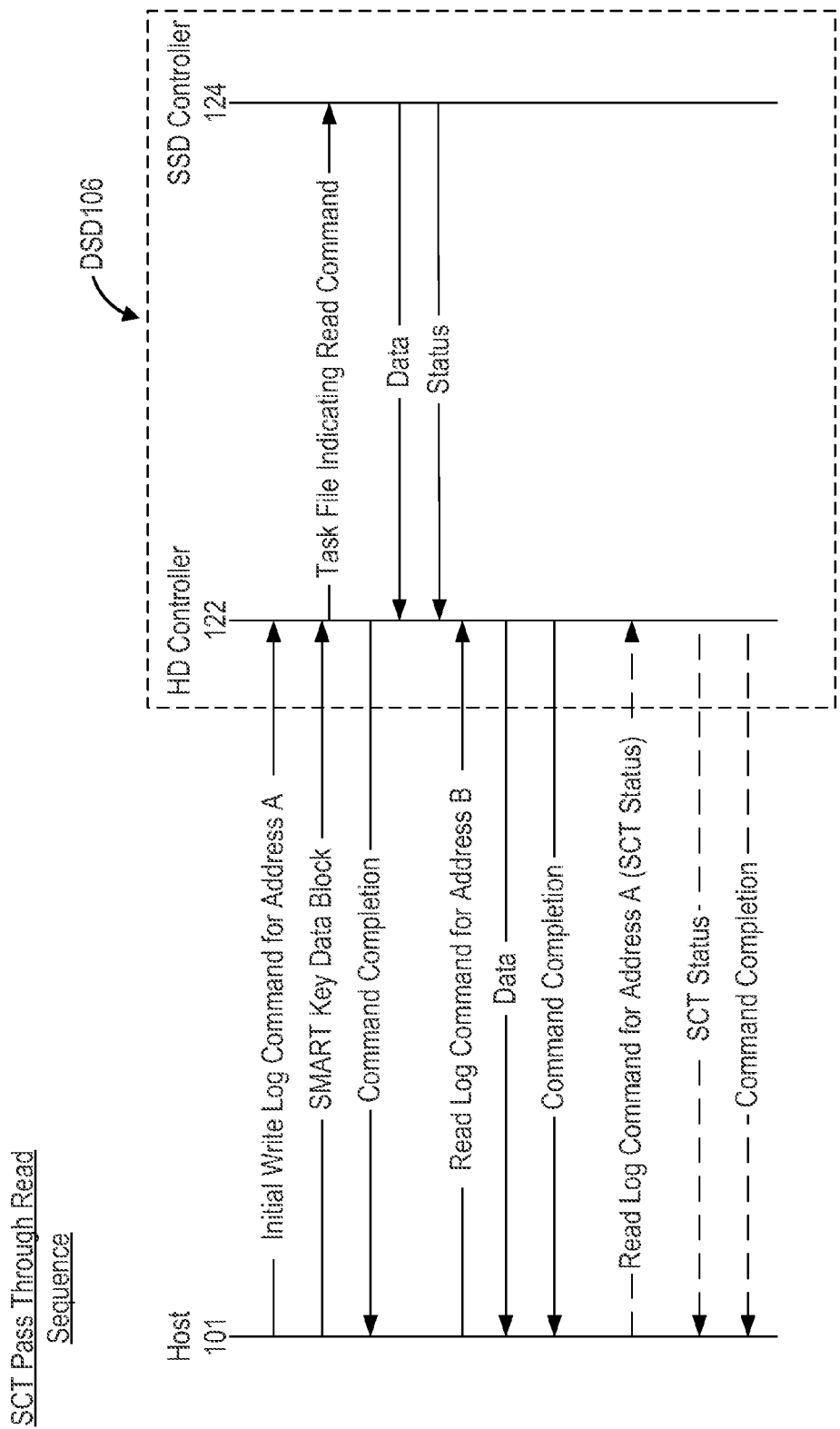
FIG. 8 is a sequence diagram depicting an example SCT pass through read sequence according to an embodiment.

A read log command for log address B will cause HD controller 122 to send data received from SSD controller 124 to host 101 as shown in the sequence diagram of FIG. 8. On the other hand, a read log command for log address A instead of log address B will cause HD controller 122 to return an SCT status to host 101 as shown in the later portions of sequence diagrams of FIGS. 7 and 8. The SCT status can be used by host 101 to determine the progress of a previously sent command for the secondary storage device. In this regard, some commands can take several minutes or hours to complete if there is other background activity for the secondary storage device. Host 101 or application 16 may therefore use the SCT status to determine the execution status of a previously sent command. The SCT status may also be used by host 101 or application 16 to determine whether SSD controller 124 is ready to receive data since some commands may need setup time before SSD controller 124 is ready to receive data from host 101 via HD controller 122.

In block 312, host 101 receives data, an SCT status, or command status from HD controller 122 in accordance with the write log or read log command sent in block 310.

Figure 4:
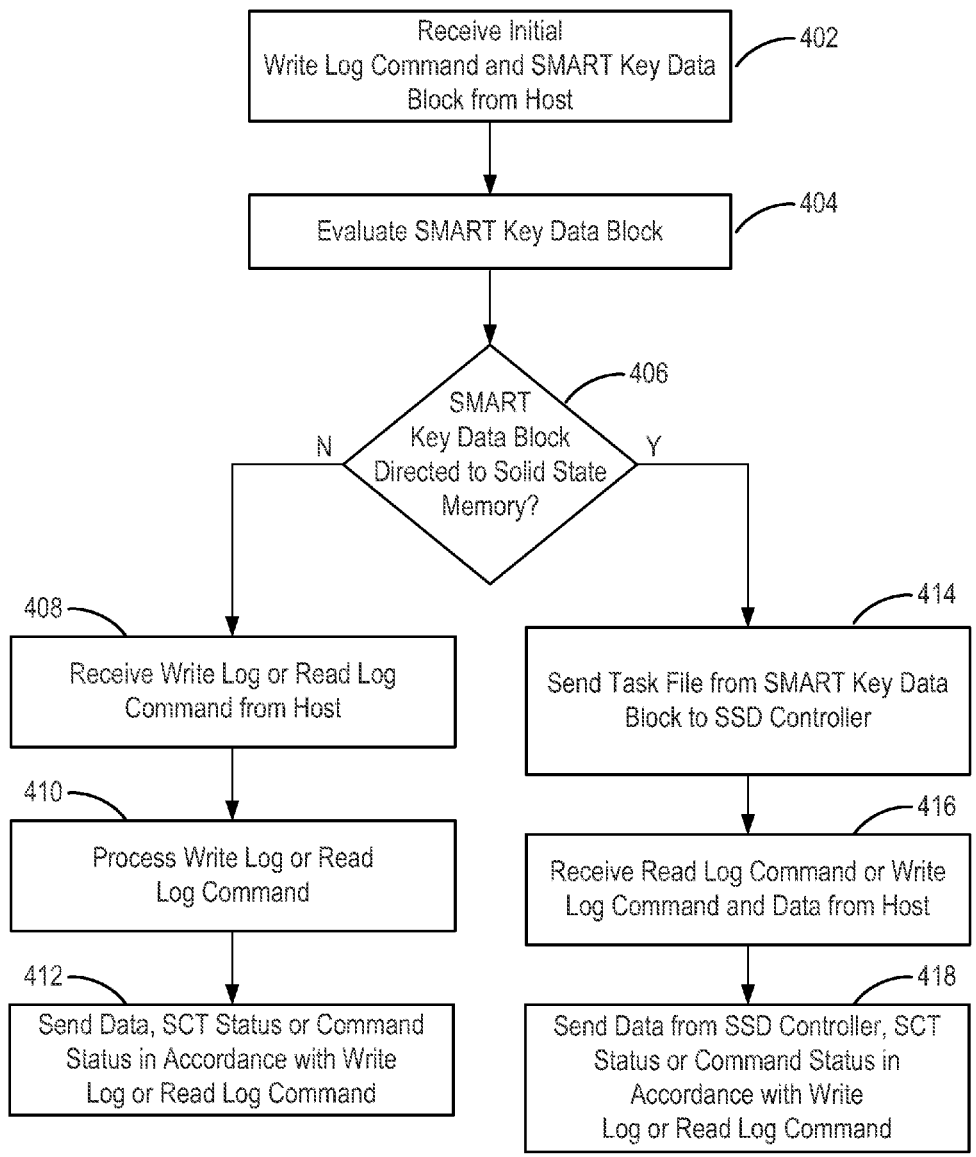
FIG. 4 is a flowchart for a communication process performed by a primary controller of a DSD to facilitate communication between a host and a secondary controller of the DSD according to an embodiment.

FIG. 4 is a flowchart for a communication process performed by the primary controller, HD controller 122, to facilitate communication between host 101 and SSD controller 124 according to an embodiment. In block 402, HD controller 122 receives an initial write log command for log address A and a SMART key data block from host 101 via host interface 126. The initial write log command and the SMART key data block can be sent by host 101 in blocks 304 and 306 as discussed above with reference to FIG. 3.

In block 404 of FIG. 4, HD controller 122 evaluates the SMART key data block to determine in block 406 whether the SMART key data block is directed to solid-state memory 128. In more detail, HD controller 122 can evaluate the action code of the SMART key data block in block 404 to determine if solid-state memory 128 is specified in the action code.

If HD controller 122 determines in block 406 that the SMART key data block is not directed to solid-state memory 128, HD controller 122 handles the command sequence in blocks 408 to 412 without involving SSD controller 124. In block 408, HD controller 122 receives a write log or read log command from host 101 and processes the write log or read log command in block 410. In block 412, HD controller 122 sends to host 101 data, an SCT status, or a command status in accordance with the write log or read log command received in block 412.

If it is determined in block 406 that the SMART key data block is directed to solid-state memory 128, HD controller 122 in block 414 sends the task file from the SMART key data block to SSD controller 124. The task file can serve as a read or write command such as an ATA read or write command that is performed by SSD controller 124.

In block 416, HD controller 122 receives a write log command with data or a read log command from host 101. As noted above with reference to Table 1, the write log or read log command indicates different functions depending upon the log address. In this regard, the write log or read log command can be directed to either log address A or B. HD controller 122 processes the write log or read log command received from host 101 and may act in accordance with a function code of the SMART key data block received in block 402.

In the case of a write log command, HD controller 122 sends the data received from host 101 to SSD controller 124 for storage in solid state memory 128. HD controller 122 then returns a command status to host 101 in block 418 indicating completion of the write log command.

In the case of a read log command for log address B, HD controller 122 in block 418 sends data to host 101 that is received from SSD controller 124 in accordance with the task file sent to SSD controller 124 in block 414. HD controller 122 may temporarily store data received from SSD controller 124 in a volatile memory such as volatile memory 140 until receiving a read log command for log address B from host 101. If the data to be returned to host 101 exceeds a particular size, HD controller 122 may send the data one data block at a time with host 101 sending a separate read log command for each data block.

In the case of a read log command for log address A, HD controller 122 sends an SCT status to host 101. The SCT status can indicate the progress of a previous command. To return the SCT status to host 101, HD controller 122 may first obtain or receive information on the status of a write or read operation from SSD controller 124.

By virtue of the foregoing communication processes, troubleshooting of solid-state memory 128 or collection of diagnostic and use information for solid-state memory 128 is ordinarily possible with a proprietary tool (e.g., application 16) on host 101 that is specific to a particular manufacturer of solid-state memory 128.

FIGS. 7 and 8 provide SCT pass through write and read sequences using the processes of FIGS. 3 and 4. FIG. 7 is a sequence diagram for performing a write log command according to an embodiment. As shown in FIG. 7, host 101 or application 16 executed by host 101 initiates the command sequence by sending an initial write log command for address A to HD controller 122. This is followed by a SMART key data block such as SMART key data block 18 in FIG. 5. HD controller 122 evaluates the SMART key data block to determine whether the SMART key data block is directed to solid-state memory 128. If so, HD controller 122 sends a task file indicating a write command to controller 124. As discussed above, the task file can be embedded or included as a part of the SMART key data block.

HD controller 122 returns a command status indicating completion of the initial write log command and whether or not the SMART key data block has been accepted by HD controller 122. In one implementation, SSD controller 124 may send an error code back to host 101 to indicate that a passcode of the SMART key data block did not match a key for SCT communication with SSD controller 124.

Host 101 then sends a write log command to HD controller 122 for log address B to indicate that data will soon be transferred from host 101 for writing to solid-state memory 128. After receiving the data from host 101, HD controller 122 transfers the data to SSD controller 124 for processing by SSD controller 124. HD controller 122 knows from the previous evaluation of the SMART key data block that the data should be passed to SSD controller 124.

HD controller 122 also sends a command completion back to host 101 indicating performance of the write log command.

As shown in FIG. 7, SSD controller 124 returns a status to HD controller 122 indicating a status of the storing of the data in solid-state memory 128. The status can indicate, for example, that the write command is still in progress or that the write command has been completed. HD controller 122 may then store the status received from SSD controller 124 in a volatile memory such as volatile memory 140.

Host 101 can request an SCT status to check on the performance of the write log command by sending a read log command for log address A to HD controller 122. The SCT status may be particularly useful when there are other activities taking place at the solid-state memory 128 or if the write command will take a long time to perform. The SCT status sequence is indicated with the dashed arrows in FIG. 7.

In the example of FIG. 7, HD controller 122 sends the SCT status to host 101 indicating the progress or completion of the write in solid state memory 128 based on the status received from SSD controller 124. In addition, HD controller 122 sends a command status indicating completion of the read log command for log address A.

FIG. 8 is a sequence diagram depicting a pass through read sequence to provide data to host 101 according to an embodiment. As shown in FIG. 8, the pass through read sequence begins the same as with the pass through write sequence of FIG. 7 with host 101 sending an initial write log command for log address A and a SMART key data block. In addition, the task file is also passed on to SSD controller 124 from HD controller 122 after HD controller 122 determines that the SMART key data block is directed to solid-state memory 128. HD controller 122 also sends a command status to host 101 indicating completion of the initial write log command and acceptance of the SMART key data block.

After receiving the task file from HD controller 122, SSD controller 124 performs a read command based on the task file and sends the data read from solid-state memory 128 to HD controller 122. As noted above, HD controller may temporarily store this data in a volatile memory such as volatile memory 140. In addition, SSD controller 124 sends a status to HD controller 122 providing information on the reading of the data from solid-state memory 128. HD controller may also store the status received from SSD controller 124 in volatile memory 140.

Host 101 sends a read log command for log address B to HD controller 122 and HD controller 122 sends the data received from SSD controller 124 to host 101. As noted above, host 101 may send multiple read log commands for log address B to receive multiple data blocks of the data read from solid-state memory 128. HD controller 122 sends a command status to host 101 indicating completion of the read log command for log address B.

As with the pass through write sequence of FIG. 7, the pass through read sequence of FIG. 8 may also include a read log command for log address A to obtain a status of the previously issued command. As shown by the dashed lines in FIG. 8, HD controller 122 sends an SCT status to host 101 based on the status information received from SSD controller 124 to indicate the status of the read log command for log address B. HD controller 122 also sends a command status to host 101 indicating completion of the read log command for address A.

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor, controller, or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed upon the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit ASIC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A data storage device (DSD) in communication with a host, the DSD comprising:
    a first media for storing data;
    a second media for storing data;
    a first controller configured to control the performance of write and read operations for the first media but not for the second media;
    a second controller configured to control operation of the second media; and
    wherein the first controller is further configured to:
        receive a Self-Monitoring, Analysis and Reporting (SMART) key data block of a monitoring system from the host, the SMART key data block including a task file;
        evaluate the SMART key data block to determine whether the SMART key data block is directed to the second media; and
        send the task file of the SMART key data block without other portions of the SMART key data block to the second controller if it is determined that the SMART key data block is directed to the second media.

2. The DSD of claim 1, wherein the monitoring system includes a SMART monitoring system.

3. The DSD of claim 1, wherein the SMART key data block includes an action code specifying the second media.

4. The DSD of claim 1, wherein the task file indicates whether the second controller is to perform a read command or a write command.

5. The DSD of claim 4, wherein the task file indicates that the second controller is to perform a write command to store data in the second media, and wherein the first controller is further configured to:
    receive a write log command and data from the host to store in the second media; and
    send the data to the second controller; and
    wherein the second controller is further configured to:
    receive the data from the first controller; and
    store the data in the second media based on the task file.

6. The DSD of claim 4, wherein the task file indicates that the second controller is to perform a read command to read data from the second media, and wherein the first controller is further configured to:
    receive data from the second controller in accordance with the task file sent to the second controller;
    receive a read log command from the host requesting the data received from the second controller; and
    send the data received from the second controller to the host.

7. The DSD of claim 1, wherein the SMART key data block includes a passcode, and wherein the first controller is further configured to evaluate the passcode to determine the validity of the SMART key data block.

8. The DSD of claim 1, wherein the first controller is further configured to:
    receive a read log command from the host for a status of a previous command;
    receive information from the second controller indicating whether the previous command has been completed by the second controller; and
    send the status of the previous command to the host based on the information received from the second controller.

9. A method for communicating between a host and a data storage device (DSD), wherein the DSD includes a first media for storing data and a second media for storing data, the method comprising:
    receiving by a first controller of the DSD, a Self-Monitoring, Analysis and Reporting (SMART) key data block of a monitoring system from the host, the SMART key data block including a task file, wherein the first controller is configured to control the performance of write and read operations for the first media but not for the second media;
    evaluating the SMART key data block to determine if the SMART key data block is directed to the second media; and
    if it is determined that the SMART key data block is directed to the second media, sending the task file of the SMART key data block without other portions of the SMART key data block from the first controller to a second controller of the DSD configured to control operation of the second media.

10. The method of claim 9, wherein the monitoring system includes a SMART monitoring system.

11. The method of claim 9, wherein the SMART key data block includes an action code specifying the second media.

12. The method of claim 9, wherein the task file indicates whether the second controller is to perform a read command or a write command.

13. The method of claim 12, wherein the task file indicates that the second controller is to perform a write command to store data in the second media, and wherein the method further comprises:
receiving by the first controller a write log command and data from the host to store in the second media;
sending the data from the first controller to the second controller; and
storing the data in the second media based on the task file.

14. The method of claim 12, wherein the task file indicates that the second controller is to perform a read command, and wherein the method further comprises:
receiving, by the first controller, data from the second controller in accordance with the task file sent to the second controller;
receiving, by the first controller, a read log command from the host requesting the data received from the second controller; and
sending the data received from the second controller to the host.

15. The method of claim 9, wherein the SMART key data block includes a passcode, and wherein the method further comprises evaluating the passcode to determine the validity of the SMART key data block.

16. The method of claim 9, further comprising:
receiving, by the first controller, a read log command from the host for a status of a previous command;
receiving information from the second controller indicating whether the previous command has been completed by the second controller; and
sending the status of the previous command to the host based on the information received from the second controller.

17. A host in communication with a data storage device (DSD) including a first media for storing data and a second media for storing data, the host comprising:
a processor configured to construct a SMART key data block of a monitoring system and directed to the second media of the DSD, the SMART key data block including a task file; and
an interface configured to send the SMART key data block to a first controller of the DSD, the first controller configured to control the performance of write and read operations for the first media but not for the second media, and to send the task file of the SMART key data block without other portions of the SMART key data block to a second controller of the DSD based on evaluation of the SMART key data block, wherein the second controller is configured to control operation of the second media.

18. The host of claim 17, wherein the monitoring system includes a SMART monitoring system.

19. The host of claim 17, wherein the processor is further configured to construct the SMART key data block with an action code specifying the second media.

20. The host of claim 17, wherein the task file indicates whether the second controller is to perform a read command or a write command.

21. The host of claim 20, wherein the task file indicates that the second controller is to perform a write command to store data in the second media; and
wherein the processor is further configured to construct a write log command for the second media and the interface is further configured to send to the first controller the write log command and data to be stored in the second media.

22. The host of claim 20, wherein the task file indicates that the second controller is to perform a read command to read data from the second media; and
wherein the processor is further configured to construct a read log command for data to be read from the second media and the interface is further configured to send the read log command to the first controller.

23. The host of claim 17, wherein the processor is further configured to include a passcode for the second media in the SMART key data block, and wherein the interface is further configured to receive a command status from the first controller indicating a validity of the SMART key data block based on evaluation of the passcode by the first controller.

24. The host of claim 17, wherein the processor is further configured to construct a read log command for a status of a previous command for the second media; and wherein the interface is further configured to:
send the read log command to the first controller for the status of the previous command for the second media; and
receive the status of the previous command for the second media from the first controller indicating whether the previous command has been completed by the second controller.

25. A method of communicating with a data storage device (DSD) including a second media for storing data and a first media for storing data, the method comprising:
constructing a SMART key data block of a monitoring system, the SMART key data block directed to the second media of the DSD and including a task file; and
sending the SMART key data block to a first controller of the DSD, the first controller configured to control the performance of write and read operations for the first media but not for the second media, and to send the task file of the SMART key data block without other portions of the SMART key data block to a second controller of the DSD based on evaluation of the SMART key data block, wherein the second controller is configured to control operation of the second media.

26. The method of claim 25, wherein the monitoring system includes a SMART monitoring system.

27. The method of claim 25, further comprising constructing the SMART key data block with an action code specifying the second media.

28. The method of claim 25, wherein the task file indicates whether the second controller is to perform a read command or a write command.

29. The method of claim 28, wherein the task file indicates that the second controller is to perform a write command to store data in the second media, and wherein the method further comprises:
constructing a write log command for the second media; and
sending to the first controller the write log command and data to be stored in the second media.

30. The method of claim 28, wherein the task file indicates that the second controller is to perform a read command to store data in the second media, and wherein the method further comprises:
constructing a read log command for data to be read from the second media; and
sending the read log command to the first controller.

31. The method of claim 25, further comprising:

including a passcode for the second media in the SMART key data block; and receiving a command status from the first controller indicating a validity of the SMART key data block based on evaluation of the passcode by the first controller.

32. The method of claim 25, further comprising:

constructing a read log command for a status of a previous command for the second media;

sending the read log command to the first controller for the status of the previous command for the second media; and receiving the status of the previous command for the second media from the first controller indicating whether the previous command has been completed by the second controller.

* * * * *